US006667943B1

(12) United States Patent
Maruyama et al.

(10) Patent No.: US 6,667,943 B1
(45) Date of Patent: Dec. 23, 2003

(54) OPTICAL DISC APPARATUS

(75) Inventors: Koichi Maruyama, Saitama-ken (JP);
Hisashi Konno, Saitama-ken (JP);
Suguru Takishima, Saitama-ken (JP);
Wataru Kubo, Saitama-ken (JP);
Hiroshi Nishikawa, Saitama-ken (JP);
Hiroshi Yamamoto, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/553,854

(22) Filed: Apr. 21, 2000

(30) Foreign Application Priority Data

Apr. 23, 1999  (JP) ............................................ 11-117214

(51) Int. Cl.⁷ ................................................. G11B 7/00
(52) U.S. Cl. ............................... 369/112.08; 369/44.23; 369/94; 369/112.23
(58) Field of Search .......................... 369/44.21, 44.22, 369/44.28, 112.21, 112.22, 112.23, 112.24, 112.03, 112.05, 112.08, 44.23, 44.27, 44.37, 94

(56) References Cited

U.S. PATENT DOCUMENTS

| 5,633,852 A | 5/1997 | Maruyama |
| 5,838,496 A | 11/1998 | Maruyama |
| 5,883,744 A | 3/1999 | Maruyama |
| 5,982,732 A | * 11/1999 | Yamanaka ................. 369/53.2 |
| 6,043,912 A | * 3/2000 | Yoo et al. ................. 369/44.12 |
| 6,088,322 A | 7/2000 | Broome et al. |
| 6,301,216 B1 | * 10/2001 | Takahashi ................ 369/44.14 |

FOREIGN PATENT DOCUMENTS

JP    11287948    10/1999

* cited by examiner

Primary Examiner—Thang V. Tran
Assistant Examiner—Bach Vuong
(74) Attorney, Agent, or Firm—Greenblum & Bernstein, P.L.C.

(57) ABSTRACT

An optical disc apparatus includes a fixed portion having a light source portion and a movable portion that holds an objective lens and moves along a radial direction of an optical disc. The fixed portion includes the light source portion for selectively emitting short and long wavelength laser beams, and a collimator lens for collimating the laser beams. The objective lens includes a positive refractive lens and a diffractive lens structure formed on a surface of the refractive lens. The diffractive lens structure has wavelength dependence such that spherical aberration varies in the undercorrected direction as wavelength of incident light increases. The objective lens converges the short wavelength laser beam of a predetermined diffraction order onto an information layer of a thin cover type optical disc, and converges the long wavelength laser beam of the identical diffraction order onto an information layer of a thick cover type optical disc.

2 Claims, 5 Drawing Sheets

NA 0.60

SPHERICAL
ABERRATION SA
SINE CONDITION SC

NA 0.60

SPHERICAL
ABERRATION
CHROMATIC
ABERRATION

Y=0.60

ASTIGMATISM

NA 0.45

SPHERICAL
ABERRATION SA
SINE CONDITION SC

NA 0.45

SPHERICAL
ABERRATION
CHROMATIC
ABERRATION

Y=0.60

ASTIGMATISM

OPTICAL DISC APPARATUS

BACKGROUND OF THE INVENTION

The present invention relates to an optical disc apparatus that is able to use a plurality of kinds of optical discs whose cover layers have different thickness. Particularly, the present invention relates to an optical disc apparatus that includes a fixed light source portion and a movable objective lens portion separated from the fixed light portion. In this specification, such an optical system (i.e., one which has separated light portion and optical system) will be referred to as a separate-type optical system. The objective lens portion moves along a radial direction of the optical disc independently of the light source portion.

The optical disc includes an information layer on which digital information is recorded, and a transparent cover layer that covers the information layer. A laser beam emerged from an optical pick-up is converged to form a beam spot on the information layer through the cover layer. A turntable of an optical disc apparatus rotates the optical disc mounted thereon, and the optical pick-up reproduces the recorded signal from the optical disc or records the information onto the optical disc. Due to difference of thickness of the cover layer, the position of the information layer with respect to the turntable varies, which changes the distance between the optical pick-up and the information layer.

Namely, the thicker the cover layer is, the farther the distance to the beam spot from the optical pick-up is. For example, since the cover layer of a compact disc (CD) or that of a CD-R has the thickness of 1.2 mm, and the thickness of the cover layer of a digital versatile disc (DVD) is 0.6 mm, the optical pick-up is required to move the beam spot away from the optical pick-up by 0.6 mm in the cover layer (0.4 mm in air) when the DVD is replaced with the CD or the CD-R.

There are two methods to move the beam spot along an optical axis direction. The first method changes the divergence of the laser beam incident onto the objective lens, which is equivalent to a change of an object distance. For instance, when the distance between the laser source and a collimator lens changes, the object distance changes. The second method moves the objective lens along the optical axis while keeping the incident laser beam parallel.

In the first method, spherical aberration sharply varies in undercorrected direction as the divergence becomes larger (the object distance decreases), which disturbs wave front of the laser beam. Thus, the diameter of the beam spot increases, which prevents the optical disc apparatus from reproducing the recorded information from the optical disc. Further, the separate type optical disc apparatus, which drives the movable objective lens portion along a radial direction of the optical disc independently of the fixed light source portion, is preferable for use in a computer to enable a high-speed access. However, in the separate type optical disc apparatus, light amount incident on the objective lens varies according to the movement of the objective lens portion when the incident light is divergent beam. Therefore, the separate type optical disc apparatus cannot adopt the first method.

In the second method, although a paraxial beam spot moves as the objective lens is moved, the change of the thickness of the cover layer changes spherical aberration. Since the cover layer is a plane parallel plate disposed in the convergent light beam, the spherical aberration varies in overcorrected direction as the thickness of the cover layer increases. Therefore, if the optical pick-up only moves the objective lens when the disc is replaced, wave front aberration of the laser beam is deteriorated, thereby the diameter of the beam spot increases.

SUMMARY OF THE INVENTION

It is therefore an object of the present invention to provide a separate type optical disc apparatus, which is capable of reducing spherical aberration for a plurality of kinds of the optical discs whose cover layers are different in thickness.

For the above object, according to the present invention, there is provided an improved optical disc apparatus, which includes a fixed portion having a light source portion and a movable portion that holds an objective lens and moves along a radial direction of an optical disc independently of the fixed portion, and which adopts the following constructions (a), (b), (c) and (d) to use a first optical disc having a first cover layer and a second optical disc having a second cover layer thicker than the fist cover layer.

(a) The fixed portion includes the light source portion for selectively emitting a first laser beam having a first wavelength and a second laser beam having a second wavelength longer than the first wavelength, and a collimator lens for collimating the first and second laser beams.

(b) The movable portion is provided with the objective lens that includes a positive refractive lens and a diffractive lens structure formed on at least one surface of the refractive lens. and an actuator that drives the objective lens for focusing.

(c) The diffractive lens structure has a plurality of concentric ring-shaped steps to have wavelength dependence such that spherical aberration varies in the undercorrected direction as wavelength of incident light increases.

(d) The objective lens converges the first laser beam of a predetermined diffraction order onto an information layer of the first optical disc, and converges the second laser beam of the identical diffraction order onto an information layer of the second optical disc.

The first laser beam having the first wavelength is used for the first optical disc having the first cover layer. It is assumed that the spherical aberration is compensated in this condition. When the first optical disc is replaced with the second optical disc having the second cover layer in the as-is status, that is, when only the thickness of the cover layer varies, the spherical aberration varies in overcorrected direction. Thus, the wavelength dependence described in (c) is given to the diffractive lens structure, and the second laser beam having the second wavelength is used for the second optical disc. The diffractive lens structure changes the spherical aberration in the undercorrected direction for the second laser beam as compared with that for the first laser beam, which cancels the change of the spherical aberration in the overcorrected direction due to the addition of the cover layer thickness.

An additional optical path length added by a diffractive lens structure is expressed by the following optical path difference function $\Phi(h)$:

$$\Phi(h)=(P_2h^2+P_4h^4+P_6h^6+\ldots)\times\lambda$$

where $P_2$, $P_4$ and $P_6$ are diffractive coefficients of second, fourth and sixth orders, h is a height from the optical axis and $\lambda$ is wavelength of incident light.

The objective lens according to the present invention may satisfy the following condition (1);

$$-15<\Phi(h_{45})/\lambda-P_2\times(h_{45})^2<-7 \tag{1}$$

where $h_{45}$ is the height from the optical axis of a point where a light ray whose NA is 0.45 intersects the diffractive lens structure.

Further, since the laser beam becomes a parallel beam between the collimator lens and the objective lens, the optical path length thereof can be determined without restraint. Therefore, a beam shaping prism can be located in the optical path.

DESCRIPTION OF THE ACCOMPANYING DRAWINGS

Figure 6A:
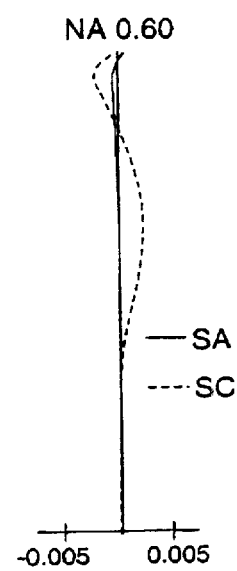
Figure 7A:
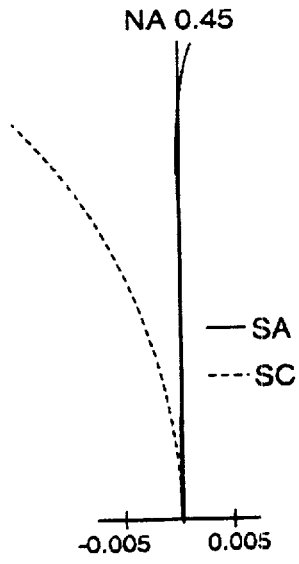
Figure 7B:
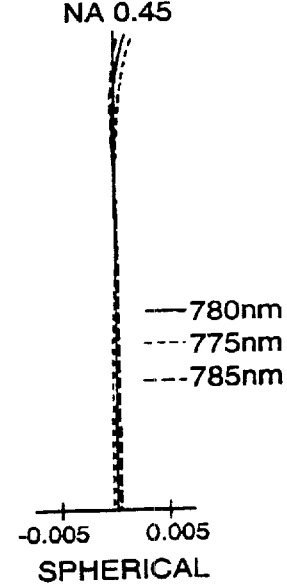
Figure 7C:
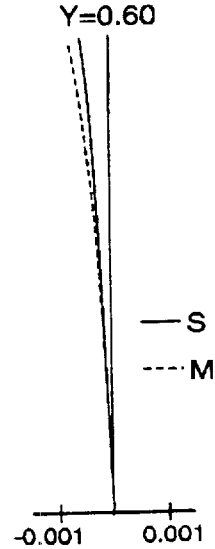

FIGS. 6A. 6B and 6C are graphs showing various aberrations of the objective lens according to the embodiment when the first optical disc is used; and FIGS. 7A, 7B and 7C are graphs showing various aberrations of the objective lens according to the embodiment when the second optical disc is used.

DESCRIPTION OF THE EMBODIMENTS

An embodiment of the present invention will be described hereinafter. In the following descriptions the total optical system of the embodiment is described first, and then, a numerical example of an objective lens in the optical system will be described.

Figure 1:
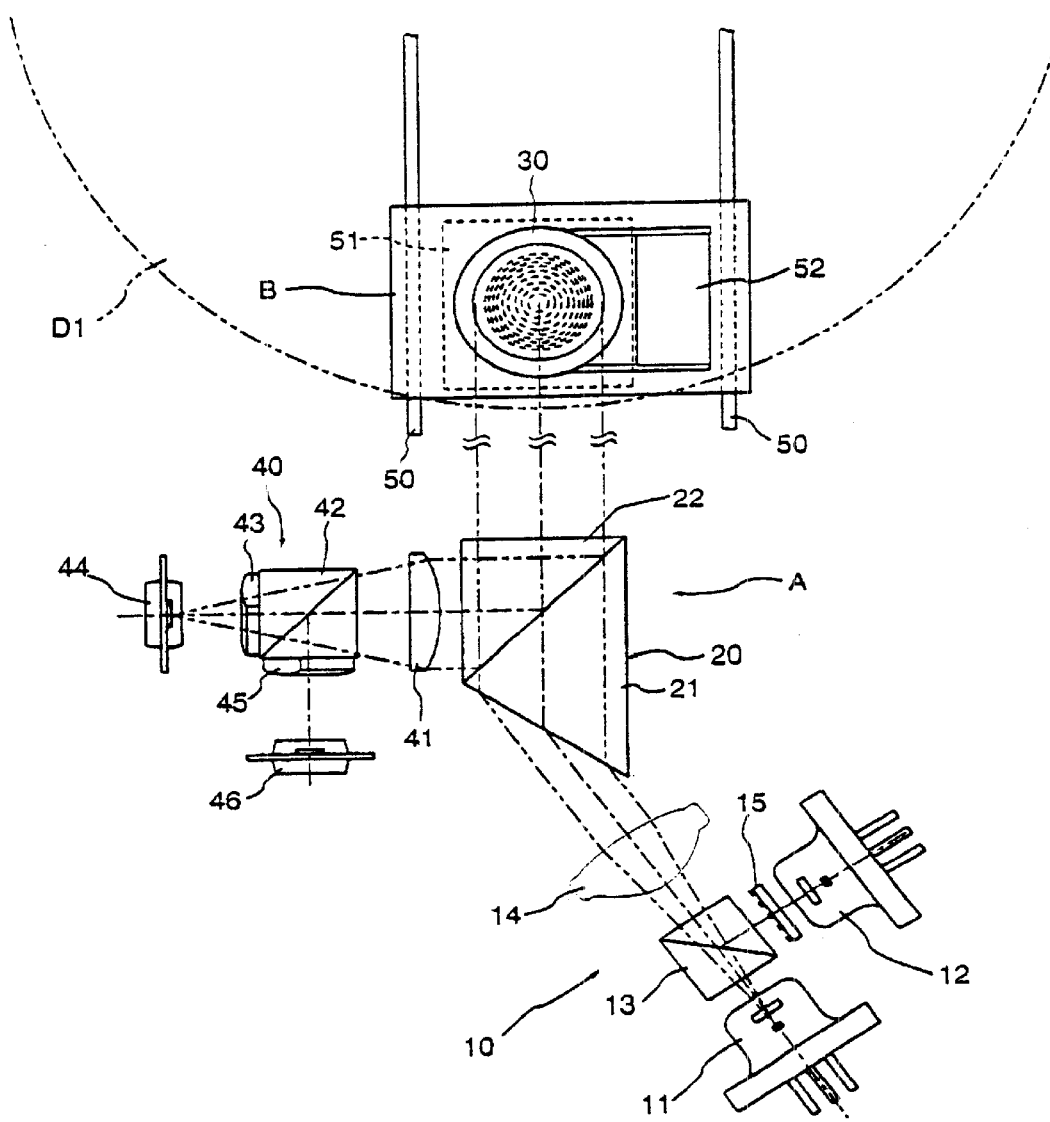
FIG. 1 shows an optical system of an optical disc apparatus according to an embodiment viewed in a plane parallel to an optical disc.
Figure 2:
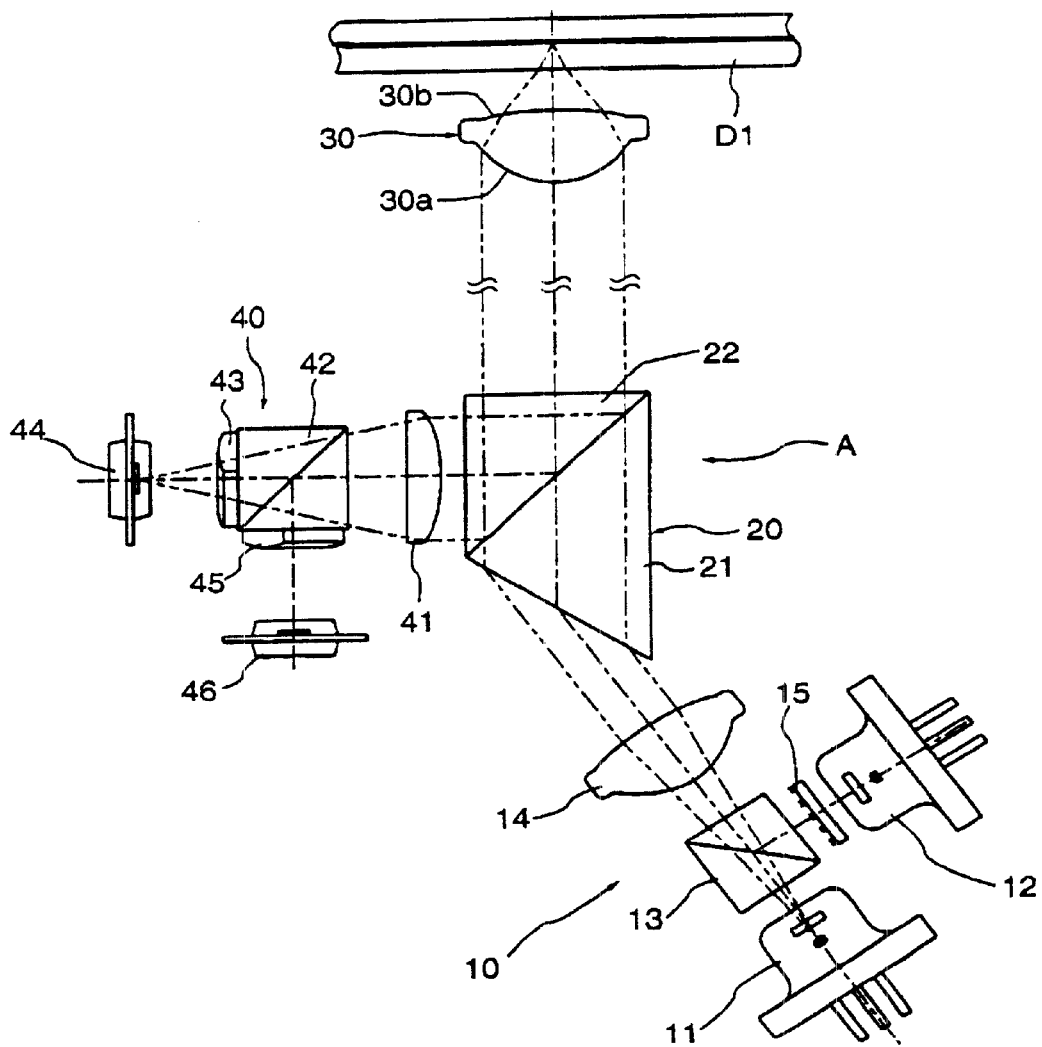
FIG. 2 is a developed view of the optical system of FIG. 1 with a thin cover type optical disc (a first optical disc)
Figure 3:
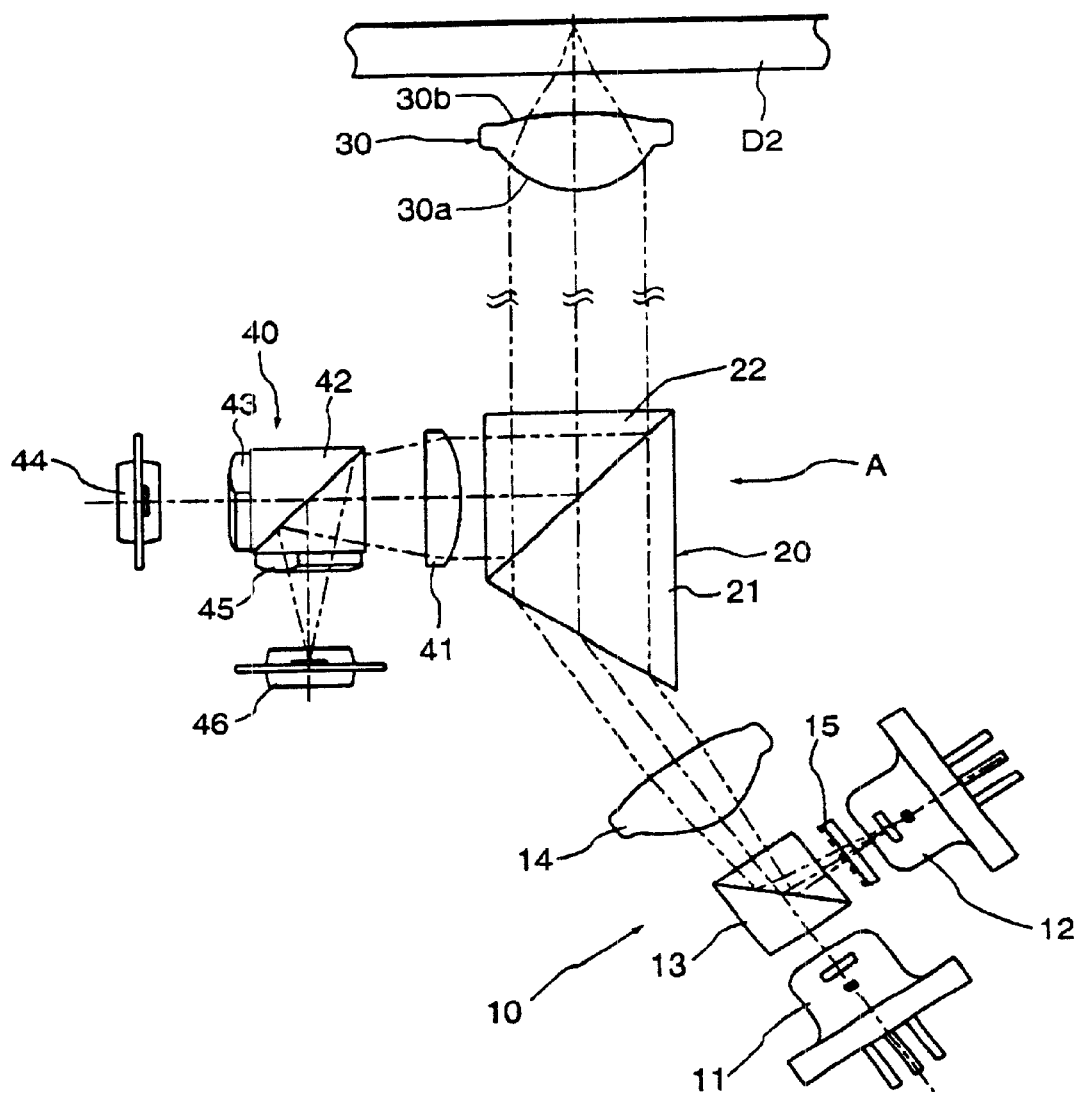
FIG. 3 is the developed view of the optical system of FIG. 1 with a thick cover type optical disc (a second optical disc)

FIGS. 1 through 3 show an optical system of the optical disc apparatus according to the embodiment. The optical disc apparatus is capable of using a first optical disc having relatively thin cover layer and a second optical disc having relatively thick cover layer. In the embodiment, the first disc has a cover layer of 0.6 mm in thickness such as a DVD (digital versatile disc) and the second disc has a cover layer of 1.2 mm in thickness such as a CD (compact disc) or a CD-R (CD recordable).

FIG. 1 shows the optical system viewed in a plane parallel to the optical disc. FIGS. 2 and 3 are developed views of the optical system with the first optical disc D1 and the second optical disc D1, respectively. The orientation of the optical axis of the objective lens is actually vertical to the sheet of FIG. 2 or 3, while the optical axis is shown parallel to the sheet for purpose of illustration.

As shown in FIG. 1, the optical disc apparatus includes a fixed portion A that is installed to a main body of the apparatus as a stationary unit and a movable portion B that moves along a radial direction of the optical disc D1 or D2.

The fixed portion A includes a light source portion 10, a beam shaping/separating prism 20 and a signal detecting portion 40.

The light source portion 10 is provided with a first semiconductor laser 11 that emits a first laser beam having relatively short wavelength $\lambda_1$ when the first optical disc D1 is used, a second semiconductor laser 12 that emits a second laser beam having relatively long wavelength $\lambda_2$ when the second optical disc D2 is used, a polarizing beam splitter 13 and a collimator lens 14. The first laser beam from the first semiconductor laser 11 is incident on the polarizing beam splitter 13 as P-polarized light and the second laser beam from the second semiconductor laser 12 is incident on the polarizing beam splitter 13 as S-polarized light.

The first laser beam passed through the polarizing beam splitter 13 is collimated by the collimator lens 14. In the same manner, the second laser beam reflected by the polarizing beam splitter 13 is collimated by the collimator lens 14. Further, a phase grating plate 15 is located between the second semiconductor laser 12 and the polarizing beam splitter 13 to divide the second laser beam into three portions for a tracking error detection by a three-beam method.

The beam shaping/separating prism 20, which consists of a pair of prisms 21 and 22 that are cemented to each other, shapes sectional shape of the laser beam from the light source portion 10 and bends the reflected laser beam from the optical disc D1 or D2 toward the signal detecting portion 40.

The movable portion B is supported by a pair of guide rails 50 that are arranged along the radial direction of the optical disc and is driven by a linear motor. The movable portion B holds a mirror 51, an objective lens 30 and an actuator 52 that drives the objective lens 30 along the optical axis thereof for focusing. The parallel laser beam from the light source portion 10 is reflected by the mirror 51 in the direction perpendicular to the sheet of FIG. 1 and is incident on the objective lens 30. The objective lens 30 then converges the parallel laser beam onto the information layer of the optical disc D1 or D2.

The objective lens 30, which is made from plastic such as PMMA, is a biconvex lens having first and second aspherical surfaces 30a and 30b. The diffractive lens structure is formed on the first surface 30a.

The laser beam reflected from the optical disc and reflected by the beam shaping/separating prism 20 is incident on the signal detecting portion 40. The signal detecting portion 40 includes a condenser lens 41, a polarizing beam splitter 42, a pair of cylindrical lenses 43 and 45, and a pair of sensors 44 and 46.

As shown in FIG. 2, the first laser beam emitted by the first semiconductor laser 11 is reflected by the first optical disc D1 and passes through the polarizing beam splitter 42 to enter in the first sensor 44 through the cylindrical lens 43. On the other hand, as shown in FIG. 3, the second laser beam emitted by the second semiconductor laser 12 is reflected by the second optical disc D2 and is reflected the polarizing beam splitter 42 to enter in the second sensor 46 through the cylindrical lens 45.

Figure 4A:
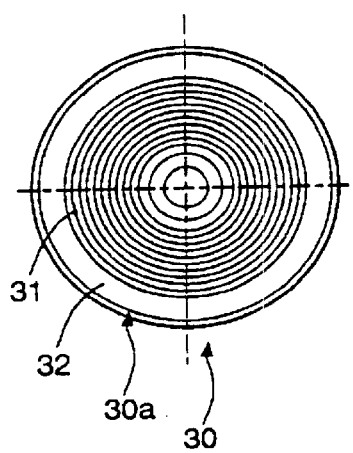
FIG. 4A is a front view of an objective lens according to the embodiments.
Figure 4B:
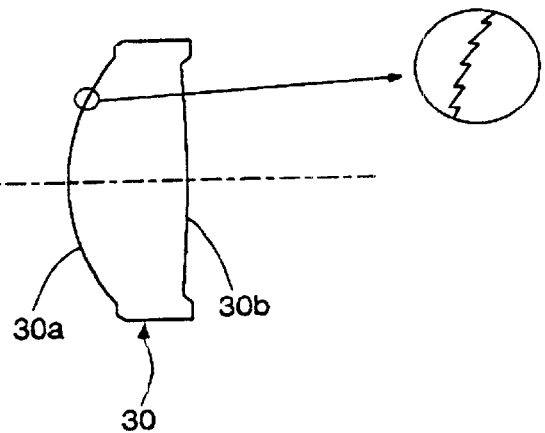
FIG. 4B is a vertical cross-sectional view of an objective lens according to the embodiments.
Figure 4C:
FIG. 4C is an enlarged view of FIG. 4B; which the objective lens according to the embodiments is mounted.

Details of the objective lens 30 will be described with reference to FIGS. 4A, 4B and 4C. FIG. 4A is a front view of the objective lens 30, FIG. 4B is a vertical cross-sectional view and FIG. 4C is an enlarged view of the first surface 30a.

The objective lens 30 is a biconvex lens having first and second aspherical surfaces 30a and 30b. The diffractive lens structure is only formed in a central area 31 of the first surface 30a. As shown in FIG. 4A, the diffractive lens structure has a plurality of concentric rings. The diffractive lens structure is a phase grating blazed for a first order diffraction light. Each of the boundaries between the adjacent rings is formed as a step in the optical axis direction giving a predetermined optical path difference as with a Fresnel lens. A peripheral area 32 of the first surface 30a is formed as a continuous aspherical surface. The boundary between the central area 31 and the peripheral area 32 is an 85% line of the maximum effective diameter of the objective lens 30 and that is equivalent to the effective diameter corresponding to NA 0.45.

The objective lens 30 converges the first laser beam onto the information layer of the first optical disc D1 and converges the second laser beam onto the information layer of the second optical disc D2.

The diffractive lens structure has wavelength dependence such that spherical aberration varies in the undercorrected direction as wavelength of incident light increases. The spherical aberration changes in the overcorrected direction as the thickness of the cover layer increases. And thus, since a longer wavelength laser beam is used for the thick cover type optical disc and a shorter wavelength laser beam is used for the thin cover type optical disc, the change of the spherical aberration due to change of the cover layer thickness is corrected by the change of the spherical aberration due to the wavelength dependence of the diffractive lens structure.

Since the recording density of the first optical disc D1 is higher than that of the second optical disc D2, the beam spot on the first disc D1 should be smaller than that on the second optical disc D2. The shorter the wavelength is, the smaller the spot diameter is. Thus, the wavelength $\lambda_1$ of the first laser beam is preferably in the 600 nm range to form the relatively small beam spot. On the other hand, the reflection characteristics of the CD-R requires the laser beam whose wavelength is about 780 nm. Use of the two semiconductor lasers having different wavelengths is predicated on the difference of the recording density and the reflection characteristics as described.

Further, since the laser beam from the peripheral area 32 forms a too small beam spot for the second optical disc D2. the peripheral area 32 is an exclusive area for the first optical disc D1. Therefore, the peripheral area 32 is formed as the continuous aspherical surface optimized for the first optical disc D1.

An additional optical path length added by a diffractive lens structure is expressed by the following optical path difference function $\Phi(h)$:

$$\Phi(h) = (P_2 h^2 + P_4 h^4 + P_6 h^6 + \ldots) \times \lambda$$

where $P_2$, $P_4$ and $P_6$ are coefficients of second, fourth and sixth orders, h is a height from the optical axis and $\lambda$ is a wavelength of incident light. The function $\Phi(h)$ represents an optical path difference between an imaginary ray that is assumed not to be diffracted by the grating and a ray that is diffracted by the grating, at a point on the diffractive lens structure where the height from the optical axis is h. In such an expression, a negative value of the second order coefficient $P_2$ repr a positive paraxial power of the diffractive lens structure. Further, the negative power increases with increasing the distance from the optical axis when the fourth order coefficient $P_4$ is larger than zero.

An actual microscopic shape of the diffractive lens structure is defined like a Fresnel lens having a large number of concentric rings. The actual shape $\Phi'(h)$ is defined by subtracting $\lambda \times m$ (m: integer) from $\Phi(h)$ as follows.

$$\Phi'(h) = (MOD(P_2 h^2 + P_4 h^4 + \ldots + C, 1) - C) \times \lambda_B$$

Symbol $\lambda_B$ is a blaze wavelength for which the steps of the grating gives an optical path difference by one wavelength, and the diffractive efficiency becomes the maximum at the blaze wavelength $\lambda_B$. Symbol C is a constant defining a phase at a boundary between adjacent rings (0=C<1). The function MOD (x, y) represents the remainder when x is divided by y. $MOD(P_2 h^2 + P_4 h^4 + \ldots + C, 1)$ is equal to zero at the boundary. The diffractive lens structure is formed on the base curve that is the lens surface of the refractive lens. Inclines and steps of the ring areas are designed such that the optical path differences are defined by $\Phi'(h)$.

The objective lens 30 according to the embodiment satisfies the following condition (1);

$$-15 < \Phi(h_{45})/\lambda - P_2 \times (h_{45})^2 < -7 \tag{1}$$

where $h_{45}$ is the height from the optical axis of a point where a light ray whose NA is 0.45 intersects the diffractive lens structure.

When the condition (1) is satisfied, the variation of the spherical aberration due to change of the cover layer thickness can be effectively canceled by the variation of the spherical aberration of the diffractive lens structure due to the wavelength change. If the intermediate term of the condition (1) becomes lower than −15, the variation of the spherical aberration due to shift of wavelength becomes too large. Since the wavelength of the laser beam emitted by the semiconductor laser has a tolerance of about ±5 nm due to an individual difference, if the variation of the spherical aberration is relatively large with respect to the change of the wavelength, it becomes impossible to use a semiconductor laser emitting a laser beam whose wavelength is different from the standard wavelength.

On the other hand, when the intermediate term of the condition (1) exceeds −7, the variation of the spherical aberration due to shift of wavelength becomes too small, which cannot cancel the variation of the spherical aberration due to the change of the cover layer thickness.

Concrete embodiment according to the above mentioned construction will be described hereinafter.

Figure 5:
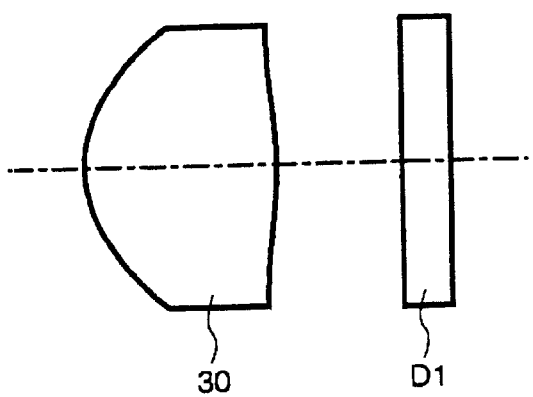
FIG. 5 is a lens diagram of the objective lens according to a first embodiment with a cover layer of the first optical disc.

FIG. 5 shows the objective lens 30 of the embodiment and the cover layer $D_1$ Of the thin cover type optical disc. The numerical constructions thereof are described in TABLE 1. The surfaces #1 and #2 represent the objective lens 30 and the surfaces #3 and #4 represent the cover layer of the optical disc. The diffractive lens structure is formed on the first surface 30a (#1) of the objective lens 30.

In TABLE 1. NA denotes numerical aperture, f (unit: mm) denotes the total focal length, $f_D$ (unit: mm) denotes focal length of the diffractive lens structure, $\omega$ (unit: degree) denotes half angle of view, $\lambda_1$ (unit: nm) denotes the wavelength for the thin cover type optical disc, $\lambda_2$ (unit: nm) denotes the wavelength for the thick cover type optical disc, $\lambda_B$ (unit: nm) denotes a blaze wavelength, $h_{45}$ (unit: mm) denotes the height from the optical axis of a point where a light ray of which NA is 0.45 intersects the diffractive lens structure, r (unit: mm) denotes a radius of curvature of a surface (the values at the vertex for aspherical surface), $d_1$ (unit: mm) denotes a distance between the surfaces along the optical axis for the thin cover type optical disc, $d_2$ (unit: mm) denotes the distance for the thick cover type optical disc, n$\lambda$ denotes a refractive index at a wavelength $\lambda$ nm and vd denotes an Abbe number.

The base curve of the first surface 30a (surface #1) is aspherical. The base curve is defined as a shape of the refractive lens that does not include the diffractive lens structure. The second surface 30b (surface #2) is also an aspherical surface. An aspherical surface is expressed by the following equation:

$$X(h) = \frac{h^2 c}{1 + \sqrt{1-(1+K)h^2c^2}} + A_4h^4 + A_6h^6 + A_8h^8 + A_{10}h^{10} + A_{12}h^{12}$$

X(h) is a SAG, that is, a distance of a curve from a tangential plane at a point on the surface where the height from the optical axis is h. Symbol c is a curvature (1/r) of the vertex of the surface, K is a conic constant, $A_4$, $A_6$, $A_8$, $A_{10}$ and $A_{12}$ are aspherical surface coefficients of fourth, sixth, eighth, tenth and twelfth orders. The constant K and coefficients $A_4$ through $A_{12}$ of the first and second surfaces of the objective lens 10 are shown in the following TABLE 2.

Further, TABLE 2 indicates coefficients of second, fourth, sixth, eighth and tenth orders $P_2$, $P_4$, $P_6$, $P_8$ and $P_{10}$ of the optical path difference function $\Phi(h)$ to define the diffractive lens structure.

TABLE 1

| $\lambda_1$ = 650 nm | NA 0.60 | f = 3.30 mm | | | |
|---|---|---|---|---|---|
| $f_D$ = 330.53 mm | $\omega$ = 1.0° | $h_{45}$ = 1.49 mm (#1) | | | |
| $\lambda_2$ = 780 nm | NA 0.45 | f = 3.32 mm | | $\omega$ = 1.0° | |
| | | $\lambda_B$ = 710 nm | | | |

| Surface Number | r | d1 | d2 | n650 | n780 | vd |
|---|---|---|---|---|---|---|
| #1 | 2.117 | 2.400 | 2.400 | 1.54082 | 1.53677 | 55.6 |
| #2 | −7.254 | 1.592 | 1.222 | | | |
| #3 | ∞ | 0.600 | 1.200 | | | |
| #4 | ∞ | | | | | |

TABLE 2

| | Surface #1 | Surface #2 |
|---|---|---|
| K | −0.4400 | 0.0000 |
| $A_4$ | −0.2560 × 10$^{-2}$ | 0.1882 × 10$^{-1}$ |
| $A_6$ | −0.8470 × 10$^{-3}$ | −0.5235 × 10$^{-2}$ |
| $A_8$ | 0.8800 × 10$^{-4}$ | 0.3275 × 10$^{-3}$ |
| $A_{10}$ | −0.7500 × 10$^{-5}$ | 0.3235 × 10$^{-4}$ |
| $A_{12}$ | −0.6200 × 10$^{-5}$ | 0.0000 |
| $P_2$ | −2.3272 | |
| $P_4$ | −1.5289 | |
| $P_6$ | −5.5184 × 10$^{-1}$ | |
| $P_8$ | 1.5292 × 10$^{-1}$ | |
| $P_{10}$ | −1.6178 × 10$^{-2}$ | |

Figure 6B:
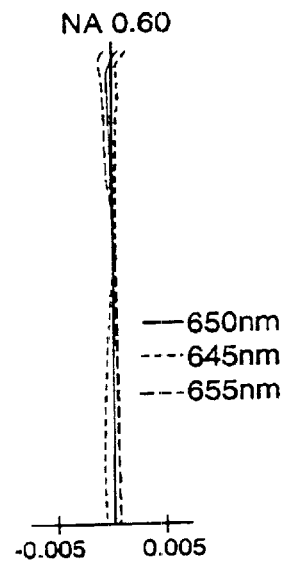
Figure 6C:
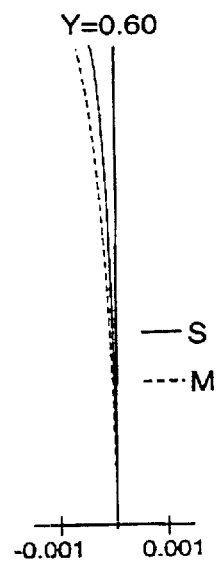

FIGS. 6A through 6C show third order aberrations of the objective lens according to the embodiment when the thin cover type optical disc is used at wavelength of 650 nm: FIG. 4A shows spherical aberration SA and sine condition SC at wavelength 650 nm; FIG. 4B shows chromatic aberration represented by spherical aberrations at wavelengths 650 nm, 645 nm and 655 nm; and FIG. 4C shows astigmatism (S: Sagittal, M: Meridional).

The vertical axes in FIGS. 6A and 6B represent the numerical aperture NA, and the vertical axis in FIG. 6C represents image height Y. Unit of the horizontal axis is "mm" in each of FIGS. 6A through 6C.

FIGS. 7A, 7B and 7C are graphs that are similar to FIGS. 6A, 6B and 6C when the thick cover type optical disc is used at wavelength of 780 nm.

The value of the condition (1) is −10.6 in this embodiment. The spherical aberration is sufficiently corrected at both of 650 nm and 780 nm as shown in FIGS. 6A and 7A.

The present disclosure relates to the subject matter contained in Japanese Patent Application No. HEI 11-117214, filed on Apr. 23. 1999, which is expressly incorporated herein by reference in its entirety.

What is claimed is:

1. An optical disc apparatus that is capable of using a first optical disc having a first cover layer and a second optical disc having a second cover layer thicker than the first cover layer, said optical disc apparatus comprising:

a fixed portion that includes,
    a light source portion for selectively emitting a first laser beam having a first wavelength and a second laser beam having a second wavelength longer than the first wavelength, and
    a collimator lens for collimating said first and second laser beams; and a movable portion that moves along a radial direction of said optical disc, said movable portion including,
    an objective lens that comprises a positive refractive lens and a diffractive lens structure formed on at least one surface of said refractive lens, said diffractive lens structure having a plurality of concentric ring-shaped steps with a wavelength dependence such that spherical aberration varies in the undercorrected direction as wavelength of incident light increases, and
    an actuator that drives said objective lens for focusing, wherein said objective lens converges said first laser beam of a predetermined diffraction order onto an information layer of said first optical disc, and converges said second laser beam of the identical diffraction order onto an information layer of said second optical disc, and wherein said diffractive lens structure satisfies the following condition (1);

$$-15 < \Phi(h_{45})/\lambda - P_2 \times (h_{45})^2 < -7 \tag{1}$$

where $h_{45}$ is the height from the optical axis of a point where a light ray having a NA of 0.45 intersects said diffractive lens structure, $\lambda$ is the wavelength of said light, and $P_2$ is a second order coefficient, when an additional optical path length, added by said diffractive lens structure, is expressed by the following optical path difference function $\Phi(h)$:

$$\Phi(h) = (P_2h^2 + P_4h^4 + P_6h^6 + \ldots) \times \lambda$$

where $P_4$ and $P_6$ are coefficients of forth and sixth orders, and h is a height from the optical axis.

2. The optical disc apparatus according to claim 1, wherein said fixed portion further comprises a beam shaping prism between said collimator lens and said objective lens.

* * * * *